Figure 1:
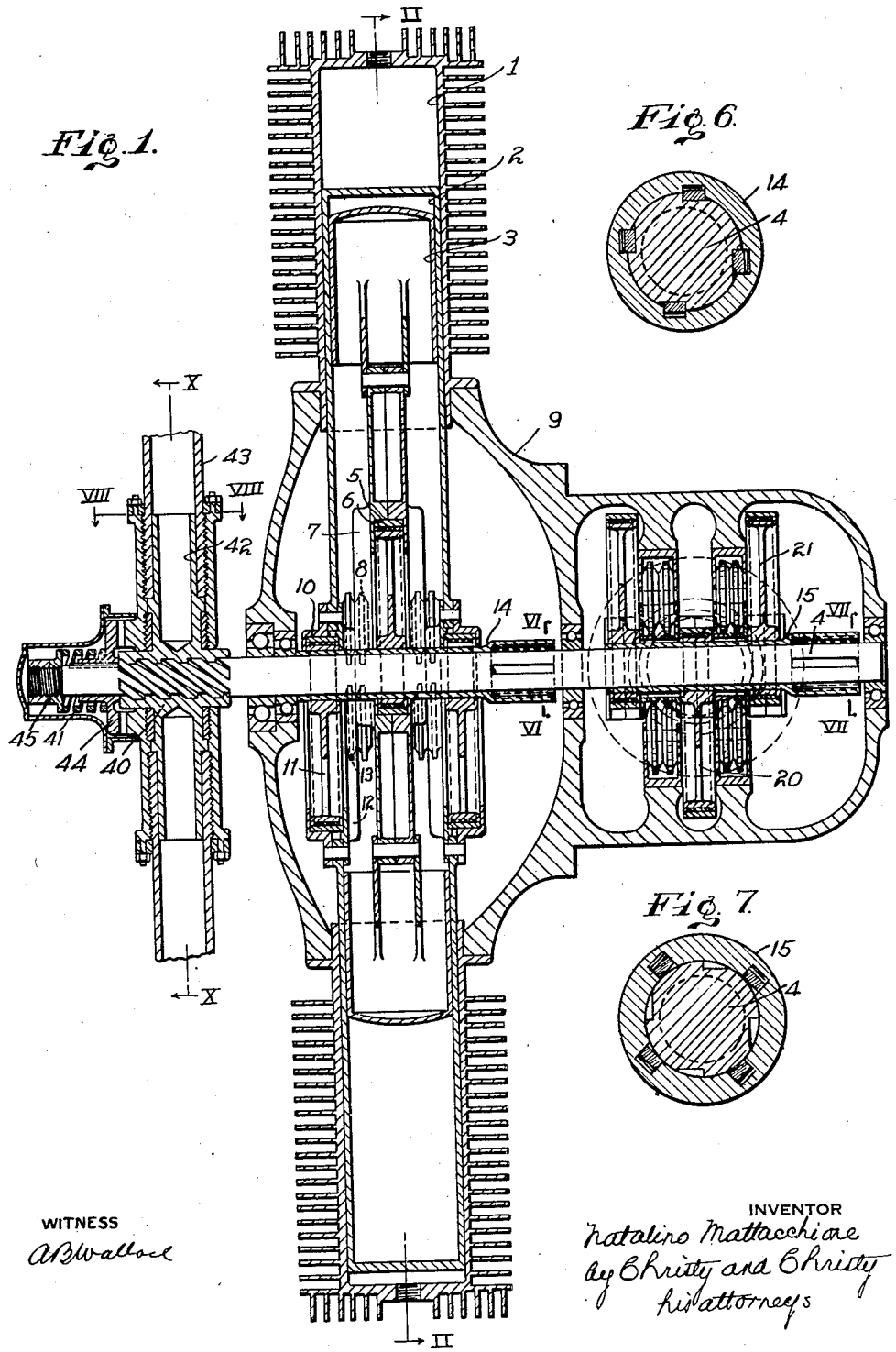
Figure 2:
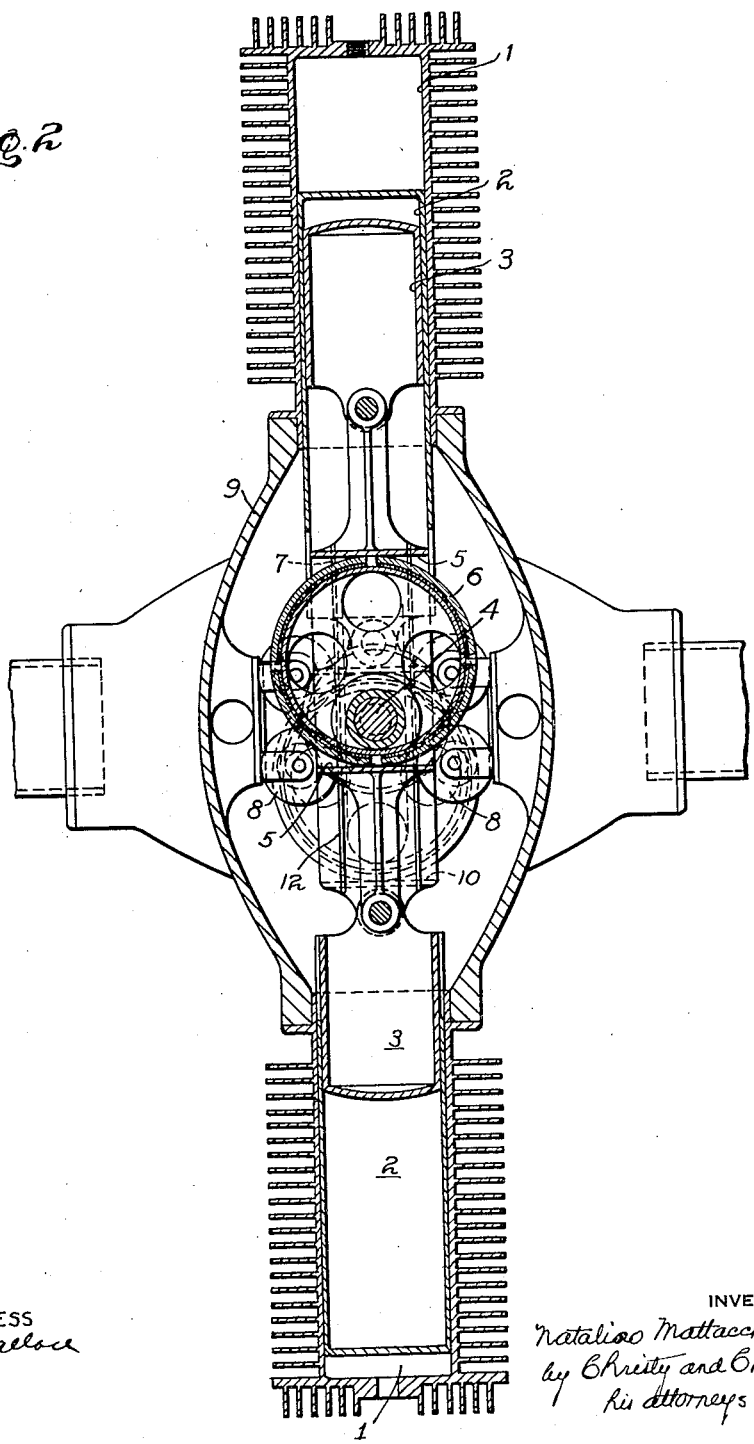
Figure 8:
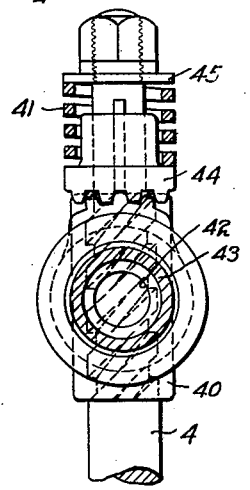
Figure 9:
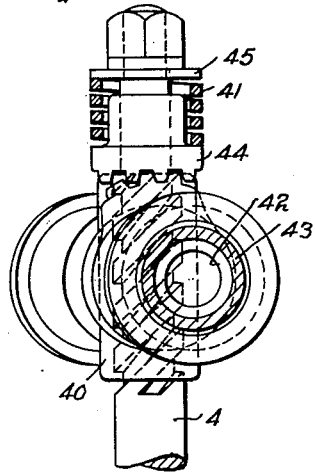
Figure 10:
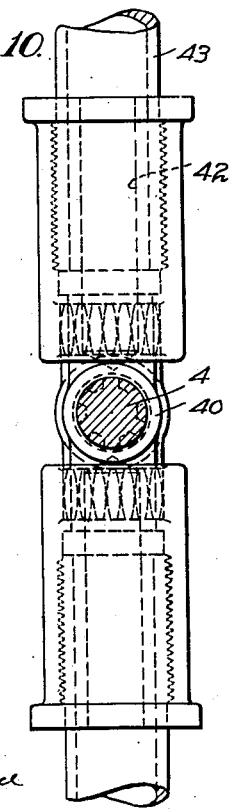
Figure 11:
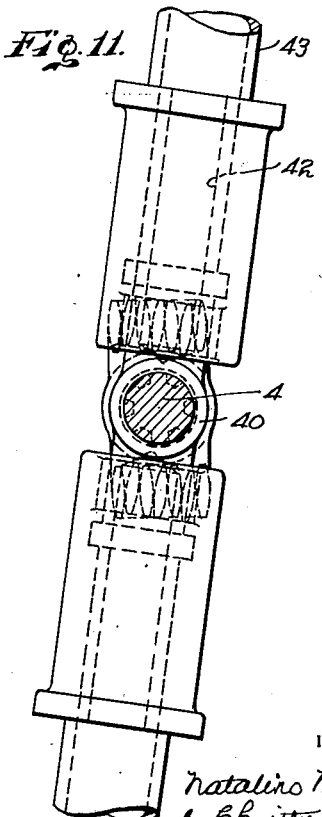

March 8, 1932.  N. MATTACCHIONE  1,848,573
VARIABLE PITCH PROPELLER
Filed June 1, 1928    4 Sheets-Sheet 1

March 8, 1932.  N. MATTACCHIONE  1,848,573
VARIABLE PITCH PROPELLER
Filed June 1, 1928  4 Sheets-Sheet 2

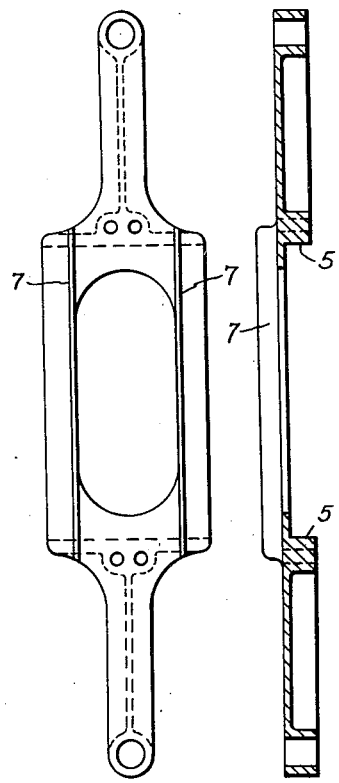
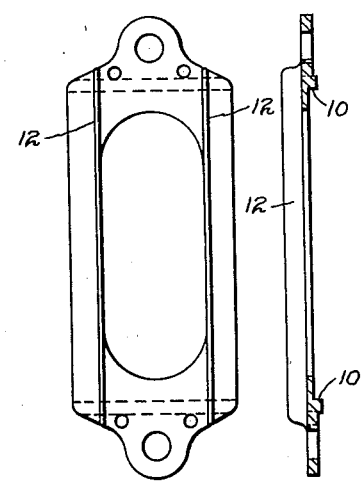
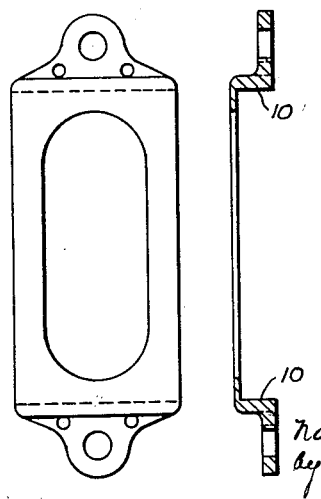

March 8, 1932.    N. MATTACCHIONE    1,848,573
VARIABLE PITCH PROPELLER
Filed June 1, 1928    4 Sheets-Sheet 4

WITNESS
A B Wallace

INVENTOR
Natalino Mattacchione
by Christy and Christy
his attorneys

Patented Mar. 8, 1932

1,848,573

UNITED STATES PATENT OFFICE

NATALINO MATTACCHIONE, OF WILSON, PENNSYLVANIA

VARIABLE PITCH PROPELLER

Application filed June 1, 1928. Serial No. 282,095.

My invention relates to improvements in power transmission, and finds practical application in engines for propellers with blades of adjustable obliquity, adapted for air plane surface. In such application I shall show and describe it.

The object in view is simplicity of structure, efficiency in power transmission, and automatic adjustment of propeller blades, according as the power varies quantitatively.

In the accompanying drawings Fig. I is a view in section on a plane which is axial with respect both to the propeller shaft and to two oppositely placed power units; Fig. II is a view in section on a plane at right angles to that of Fig. I, the plane indicated at II—II, Fig. I.

Fig. III shows in elevation and in section one of the two duplicate members which together constitute an interconnection between certain movable parts; Figs. IV and V similarly show two members which together constitute an interconnection between certain other movable parts; Figs. VI and VII are views in section, and to somewhat larger scale, and the showing is the same whether on the plane indicated at VI—VI or VII—VII, Fig. I. The two figures, VI and VII show in alternate active and inactive positions either and both of two clutches. Figs. VIII and IX are views in section, on the plane indicated at VIII—VIII, Fig. I, showing certain parts in alternative positions; and Figs. X and XI together illustrate the same change in position, but the plane of section of Figs. X and XI is that indicated at X—X, Fig. I.

The power units here shown are internal combustion engines of double-cylinder, four-cycle type; that is to say, each engine includes a cylinder within a cylinder, and a piston within the inner cylinder. The inner cylinder serves as a piston in its relation to the outer cylinder, and as a cylinder with relation to the piston within it. A plurality of such double-cylinder units are arranged in pairs, in diametrically opposite positions with respect to the propeller shaft between. In the instance illustrated in the drawings two pairs of units are shown. Each unit includes an outer cylinder 1, an inner cylinder 2, and a piston 3, and between them extends the propeller shaft 4.

The pistons 3 of the oppositely paired engine units are rigidly interconnected, and move as a unit; and in like manner the inner cylinders 2 are interconnected, and they also move as a unit.

The interconnection between the pistons 3 includes a yoke made up of two such members as are shown in Fig. III and adapted in the assembly to surround the propeller shaft and to move freely in a direction perpendicular to the axis of the propeller shaft. This yoke is provided with opposite bearing faces 5 which extend in planes perpendicularly to that diametrical line through the shaft 4 in which the axes of the engine units lie. Upon these bearing surfaces, with proper clearance for operation, an eccentric disk 6 borne by shaft 4 bears, in substantial tangency. The yoke is further provided with bearing faces 7, which in the assembly are engaged by rollers 8, suitably mounted rotatably in the walls of an enclosing casing 9.

Similarly, the interconnection between the inner cylinders 2 includes a pair of yokes, made up each of the two members of Figs. IV and V, and in the assembly placed oppositely with respect to the axis of the cylinders themselves, and spaced, as indicated in Fig. I, to work free of interference with the yoke first mentioned. Each of this pair of yokes, similarly to the structure already described, is provided with opposite bearing faces 10, and upon these bearing surfaces, with proper clearance, eccentric disks 11 borne by shaft 4 bear, in substantial tangency. These yokes also are provided with longitudinally extending bearing surfaces 12, whose opposite faces are engaged by rollers 13, mounted as are rollers 8.

The two engine units are thus arranged in counterpoise. When in a cylinder chamber of one unit the exploded charge is driving one of the pistons inward and through the eccentric is imparting rotation to the shaft, the same connection is effective directly to drive the corresponding member of the other unit outwardly, to compress a fresh charge or to scavenge a cylinder chamber, as the case may be. The cage through which the thrust is transmitted, being rigid and movable in ways defined by rollers (themselves mounted on a stationary support), transmits the thrust with fullest effect.

In the range of rotation of the eccentric disks, the points of tangency upon bearing faces 5 and 10 move from coincidence with the axial line of the engine units (the position of Fig. II), first to one side and then to the other, but such lateral displacement of the line of strain is at the maximum slight, and the cages being rigid and integral members borne on roller bearings, the structure is strong to endure the slight periodic deviation in the line of strain.

As shown in Fig. I, the engine includes a plurality of oppositely arranged pairs of power units operating upon the common propeller shaft 4. The cam disks of such second pair of units are indicated at 20 and 21. The structure may be understood to be identical with that already described. This second pair of units is arranged on a common axis, perpendicular to that of the first pair.

The eccentrics 6, 11, 20, and 21 are not mounted immediately upon the shaft 4; but eccentrics 6 and 11 of one pair of units are mounted upon sleeve 14, and the eccentrics 20 and 21 of the other pair are mounted upon sleeve 15, and the two sleeves independently engage shaft 4 by clutches of the character sufficiently indicated in Figs. VI and VII. The forward drive of the sleeve (here indicated 14) is counter-clockwise, and it will be perceived that by interengagement of the clutch parts the driving thrust is imparted to the shaft. If either sleeve lags in its speed of turning, or is at rest, the turning of the other sleeve will, independently, through its proper clutch impart to the shaft its rotative power.

The shaft 4 carries a hub 40; the connection between shaft and hub is a screw-thread connection, and the two parts are capable of relative movement. Outward movement of the hub upon the shaft (movement from right to left, Fig. I) is opposed and resisted by a spring 41. The spring is held under compression between the hub and a block 45 borne by the shaft. Manifestly, as shaft 4 rotates, hub 40 tends to move outward. This tendency is opposed and overcome by the tension of spring 41, and when a condition of equipoise of forces is reached, the hub 40 rotates at equal rate of turning with shaft 4. And as the power of turning of shaft 4 increases, so the hub 40 moves to the left, compressing to greater degree the spring 41. The particular position of the hub then automatically varies as the power under which the shaft is turning varies.

The hub carries radially extending arms 42 upon which the stems 43 of the propeller blades are rotatably mounted. A block 44 keyed to shaft 4 is provided with gear teeth, and the stems of the propeller blades are provided with gear teeth which mesh with those upon the block 44, as clearly seen in Figs. VIII and IX. And it will be perceived that as hub 40 moves longitudinally upon shaft 4, and in so doing turns slightly in its position upon the shaft, the propeller blades, in consequence of the gear-tooth engagement described, rotate correspondingly on their axes. It is then a matter of adjustment automatically to effect correspondence between propeller blade position and amount of driving power. If one pair of engine units and no more be active, the spring will have relatively great effect to hold hub 40 to the right, and then, it may be understood, the blades of the propeller will be inclined but slightly to the plane in which they revolve; but if both of the pairs of engine units shown be active, the spring will yield under the greater force; hub 40 will stand in position further to the left, and then, it will be understood, the blades of the propeller will be inclined at a greater angle to the plane of revolution. Speed of turning will be maintained within a narrower range, and obliquity of blade will vary, to give greater driving power under increased driving force.

Notice is hereby given of my co-pending application, Serial No. 581,310, filed December 16, 1931.

I claim as my invention:

1. In a power driven vehicle a rotatable propeller shaft, a hub borne by said shaft and engaging said shaft by screw-thread connection, and movable in its mounting upon said shaft in the direction of the axis of the shaft, a spring engaging said hub and tending to resist relative movement of hub and shaft, a propeller blade borne by said hub and movable in the degree of its inclination to the plane of revolution, and means for moving the blade in such degree of inclination, in response to movement of the hub relative to the shaft.

2. The structure of claim 1, together with a plurality of pairs of oppositely arranged power units, each pair of units including corresponding movable parts integrated together, and a separate one-direction clutch through which each pair of units transmits rotation to the shaft.

3. In a power driven vehicle a rotatable propeller shaft, a hub borne by said shaft and engaging said shaft by screw-thread connection and movable upon said shaft in the direction of the axis thereof, a spring arranged between shaft and hub and tending to resist relative movement of hub and shaft, a propeller blade borne by and extending radially from said hub and rotatable in its bearing, and interengaging gear teeth borne by shaft and by propeller blade, whereby movement of hub upon shaft effects rotation of propeller blade.

In testimony whereof I have hereunto set my hand.

NATALINO MATTACCHIONE.